(12) United States Patent
Armorer et al.

(10) Patent No.: US 8,712,966 B1
(45) Date of Patent: Apr. 29, 2014

(54) BACKUP AND RECOVERY OF DISTRIBUTED STORAGE AREAS

(75) Inventors: Peter Armorer, Mississauga (CA); Anselmo J. Barrero, San Jose, CA (US); Jason Filuk, San Francisco, CA (US); Dung (Jane) Thi Tang, Toronto (CA)

(73) Assignee: EMC Corporation, Hopkinton, MA (US)

( * ) Notice: Subject to any disclaimer, the term of this patent is extended or adjusted under 35 U.S.C. 154(b) by 1639 days.

(21) Appl. No.: 11/891,237

(22) Filed: Aug. 9, 2007

(51) Int. Cl.
*G06F 17/30* (2006.01)
*G06F 15/16* (2006.01)

(52) U.S. Cl.
USPC .......................................................... 707/645

(58) Field of Classification Search
None
See application file for complete search history.

(56) References Cited

U.S. PATENT DOCUMENTS

| | | | |
|---|---|---|---|
| 7,366,742 B1* | 4/2008 | Umbehocker et al. | 707/204 |
| 2002/0184239 A1* | 12/2002 | Mosher et al. | 707/200 |
| 2005/0278397 A1* | 12/2005 | Clark | 707/204 |

\* cited by examiner

*Primary Examiner* — Alex Gofman
(74) *Attorney, Agent, or Firm* — Barry N. Young

(57) ABSTRACT

A system and method for centralized backup and recovery of enterprise content management systems comprises a plurality of distributed heterogeneous content systems comprising distributed content servers having storage areas for managed content. Backup comprises querying the content servers associated with the distributed content systems to determine the host names, directory locations, and directory file structures of the storage areas, and launching coordinated backup processes on each of the distributed servers to backup in a particular order full text index files, databases containing metadata related to the files in storage areas, and storage area content. Backup and recovery is managed by a centralized backup/recovery server application that invokes backup and recovery client processes on the distributed remote content servers.

6 Claims, 7 Drawing Sheets

BACKUP AND RECOVERY OF DISTRIBUTED STORAGE AREAS

BACKGROUND OF THE INVENTION

This invention relates generally to the backup and recovery of data and information in enterprise content management systems, and more particularly to the centralized backup and recovery of content from distributed storage content systems and distributed storage areas in an enterprise network.

In today's global business environment, data and applications for large enterprises must be available on a 24×7 basis, and the data content must be consistent across the enterprise even as the volume of data constantly grows. This requires technologies to optimize application up time and meet storage and accessibility requirements, and to provide efficient data management systems. In today's business environment, enterprises typically employ enterprise-wide content management systems for managing and storing enterprise data and applications. Such systems usually include a content repository comprising multiple content systems, each managing one or more distributed storage areas. It is important to maintain the entire content management system in a consistent state across the enterprise, and to back up the system in order to permit recovery and/or restoration of files due to database corruption, disk failures or system failures. Content management systems generally include not only content storage areas in which application data and files are stored, but also database storage areas containing metadata associated with content in the content storage areas, as well as full text searchable indexes to facilitate recovery. Storage areas distributed across the enterprise on different remote hosts may have heterogeneous file and operating systems, and traditionally have had separate backup processes rather than a centralized backup/recovery system.

Managing the backup and recovery of multiple distributed storage areas of content systems in order to afford a consistent content repository is not a simple task. Not only must the various components in the distributed content systems be located and identified, the components must still be backed up in a particular coordinated order with respect to the other components such as a full text index (FTI) and a database (DB) to ensure consistency, as well as in a manner which minimizes the inaccessibility of the storage areas during the backup and/or recovery processes.

There is a need for providing backup and recovery systems and methods for backing up distributed storage areas that address the foregoing and other known problems of enterprise backup in recovery systems, and it is to these ends that the present invention is directed.

DETAILED DESCRIPTION OF PREFERRED EMBODIMENTS

The invention is particularly well-adapted to the backup and recovery of enterprise-wide content management systems in which content is managed and stored in distributed storage areas across the enterprise, and will be described in that context. It will be appreciated, however, that this is illustrative of only one utility of the invention.

Figure 1:
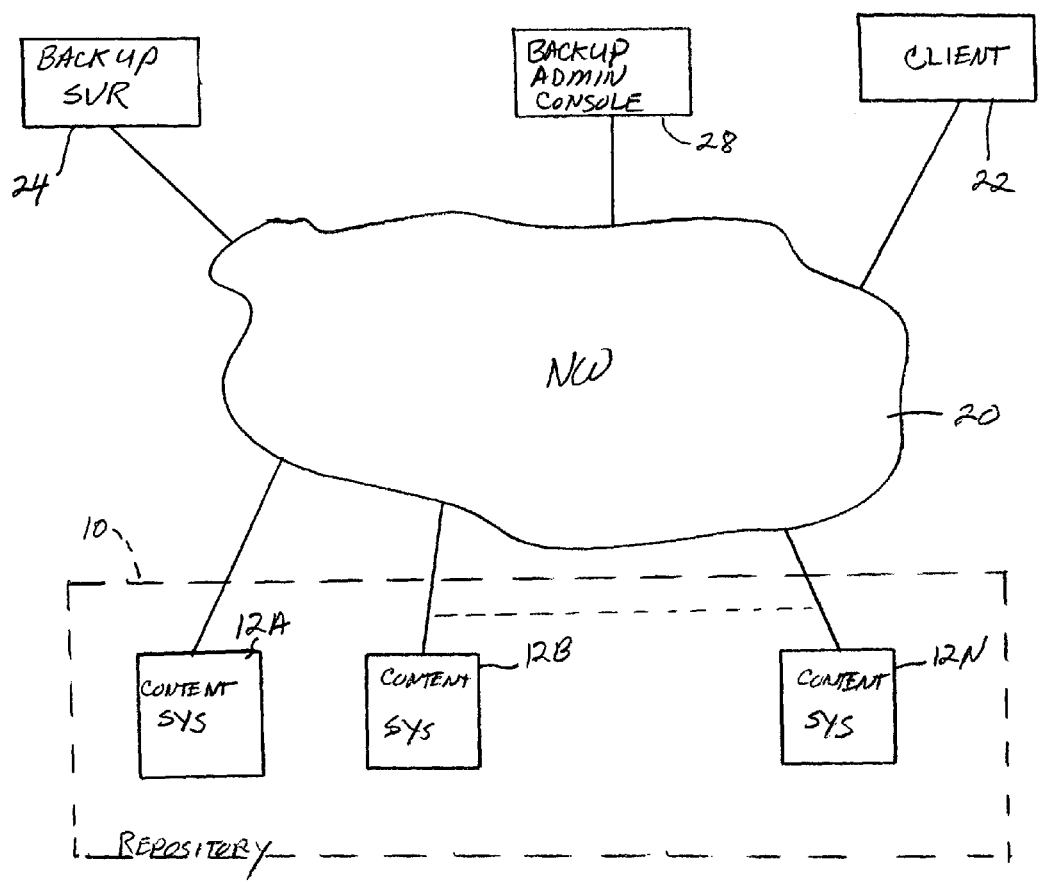
FIG. 1 is a diagrammatic view of an enterprise content management system comprising multiple content systems of the type with which the invention may be employed.

FIG. 1 is a block diagram of an enterprise-wide content management system of the type with which the invention may be employed. The system of FIG. 1 may comprise a content repository 10 comprising a plurality of separate content systems 12 A, B . . . N, each of which may manage one or more distributed storage areas (SAs) that collectively comprise a logical distributed storage area for storing managed content and data related to that content. The content systems 12 may be connected through a network 20 to one or more clients 22 which access and store data in the content systems. This system may further comprise a backup server 24 connected to the network for backing up and restoring information in the content systems 12. The backup server and backup process may be controlled by a backup administrator console 28 also connected to network 20.

As will be described in more detail shortly, the invention affords a centralized system and process for backing up content and associated information of repository 10 across network 20. The backup administrator console 28 provides centralized control of the backup as well as the recovery and restore processes, and the content server of one content system will be designated as a primary content server (PCS) for managing the other content systems during the backup process, as will be described. In a preferred embodiment, backup media may be associated with the content server of each content system, and a backup server process may reside on each server.

Figure 2:
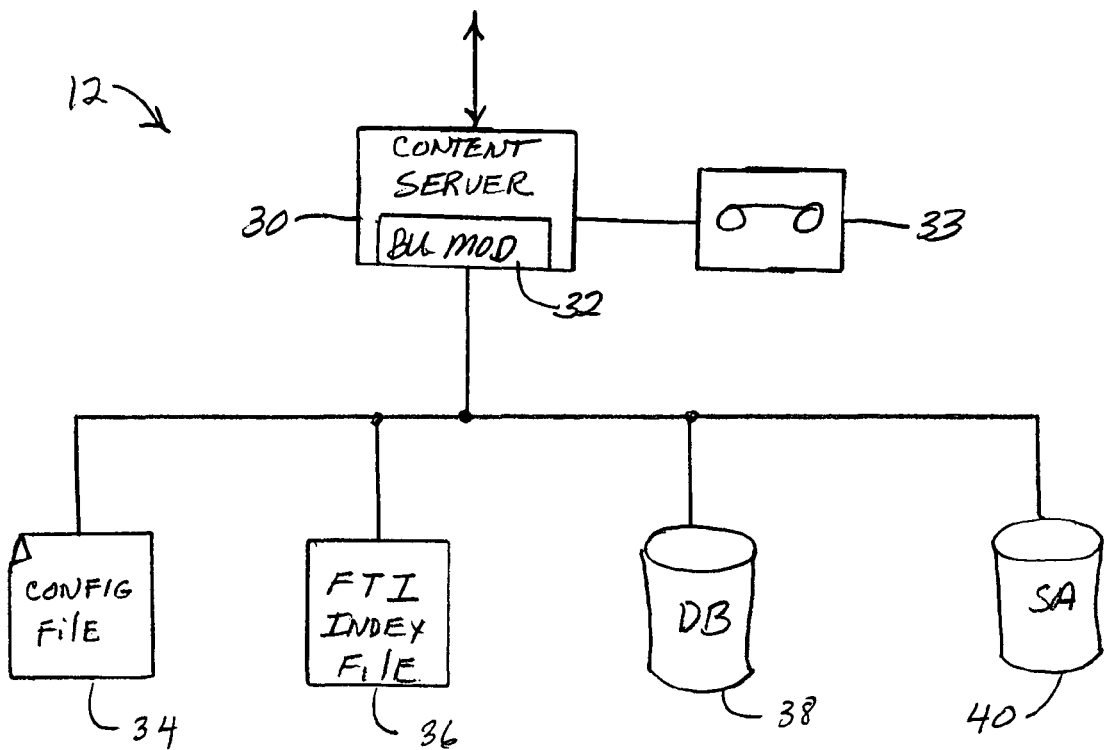
FIG. 2 is a block diagram illustrating an embodiment of a content system of FIG. 1.

FIG. 2 is a block diagram of an embodiment of a content system 12 of FIG. 1. Not all content systems 12 A, B . . . N may have the same configuration as shown in FIG. 2. In fact, the configuration of the content system shown in FIG. 2 may be for a primary content server system (PCS), as will be described below. Each content system 12 is characterized in providing one or more storage areas (SA) 40 for storing managed content associated with a separate host or content server 30. As shown in FIG. 2, content server 30 may have an associated backup/recovery client module 32 and associated backup media 33. The backup/recovery module may comprise computer readable media embodying computer program processes that cooperate with a backup server application on the backup server 24 and control the operation of the content servers for backup and recovery processes. Each of the content servers 30 of the distributed content systems also comprise backup clients of the centralized backup server 24, and each server may also have a backup module 32 comprising a client module of a backup/recovery server process running on backup server 24. In one embodiment, the backup module may also comprise a backup server process. Content system 12 may also include a configuration file 34, a full text index file (FTI) 36, a database (DB) 38 and one or more storage areas (SA) 40. In other embodiments, the full text index and the database may be associated with separate, exclusive DB/FTI servers and store information for all enterprise content systems.

Storage area 40 may comprise a plurality of physical storage devices that are logical combined together as a single unit. The storage areas contain the content files of the enterprise, such as word processing documents, video, application data, etc., and the various storage areas of the distributed content systems comprise distributed storage areas for storing enterprise content. Database (DB) 38, which may comprise a commercially available database management system as, for example, available from Oracle, Microsoft SQL, or Sybase. The database stores content management system objects, such as metadata relating to document version information, document ownership, and folder or file type information of the content stored in the storage areas. The database may also contain references to storage area files. The primary content server may have a local database, which may comprise a single centralized database for the enterprise. The database may itself be on a different database server that is associated with the primary content system.

The full text index file (FTI) 36 may contain a plain text searchable index of the different file formats and other information on the documents in each storage area. Each content system may have a local FTI component, and/or there may be one central FTI for the enterprise associated with the primary content system, as previously indicated for the database.

Configuration files 34 contain information about options or preferences for backup on a particular host server. Configuration files specify, for example, parameters for executing an application, whether the backups are encrypted, assigned host names, the number of backup streams which may run in parallel, information on file system configurations and parameters, and provide information on local and remote processes to indicate how they should be configured to run. Configuration preferences may also include source data configuration, destination backup data configuration, system configuration, user access configuration backup consistency configuration, security configuration as well as specification of backup tools, utilities or scripts. Each host (content server) may have its own configuration file, and in one embodiment the primary content server may store centralized information on the configuration files for the secondary content servers. This information may include file names and parameters for the backup processes on the secondary content servers that are passed to the secondary servers so that the backup processes may be started and run. The file names and parameters may be passed to the remote hosts, for example, on a command line from the primary content server.

Figure 3:
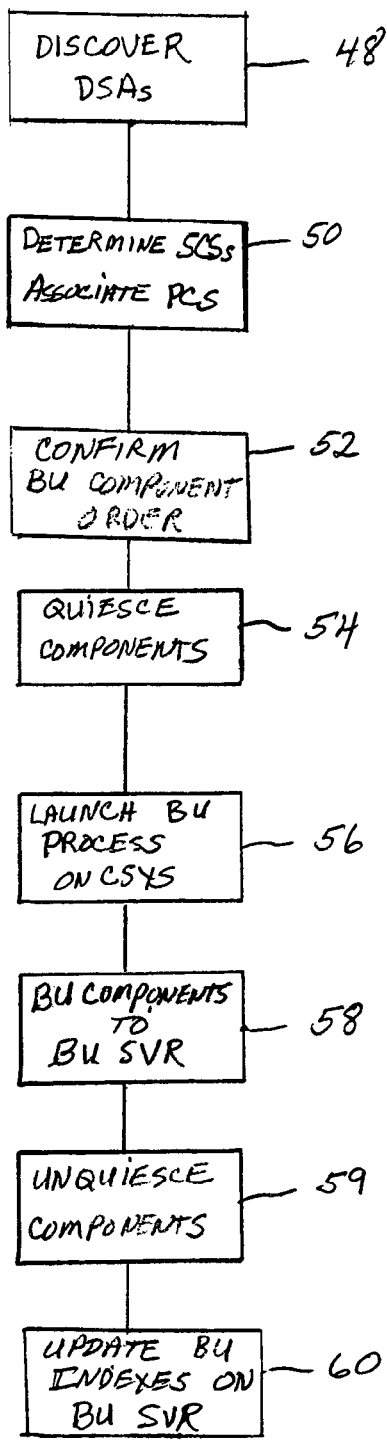
FIG. 3 is a flowchart illustrating an overview of an embodiment of a process for backing up distributed storage areas.

FIG. 3 is a flowchart which illustrates an overall generalized process for backing up distributed content systems and distributed storage areas. Unlike traditional content management systems where storage areas are managed by a single server, in enterprise content management systems of the type to which the invention applies there are multiple content systems and multiple content servers, as previously described, which manage content stored in distributed storage areas. Before a backup process can be started on an enterprise type system, it is first necessary to discover the locations of the distributed storage areas (DSA) on the various content servers, as indicated at 48. Next, at 50, the process determines all secondary content servers (SCSs) and associates them with the primary content server (PCS) as one distributed content repository and later stores indexing information for the hosts tied to one logical backup session. The backup order of the components to be backed up (FTI, DB and SAs) is important in order to ensure consistency and is normally predetermined and set as a default (although it may be user configurable). For example, while a storage area component backup might reference metadata not contained in a database component backup, the database component must not reference data not contained in the storage area component backup. Accordingly, the database component should be backed up before the storage area component. Similarly in some embodiments, the full text index backup must be initiated before the database backup, so that the full text index backup will not reference metadata not contained in the database backup. Additionally, the order of backup may be dependent in some instances upon one or more characteristics of the storage components and/or the content system. At 52, the process may confirm the backup order of the components.

Before backing up the storage components of the various content systems, the components are first quiesced prior to backup, as indicated at 54. Quiescing refers to preventing certain operations on a component during backups which could cause inconsistencies or adversely impact performance, such as preventing updates to the component which could cause conflicts and result in inconsistencies. Next, at 56, backup processes are launched on the content systems, and at 58 the components of a content system are backed up to the network backup server and backup media. At 59, the components are unquiesced, and at 60 backup database indices on the backup server are updated.

Figure 4:
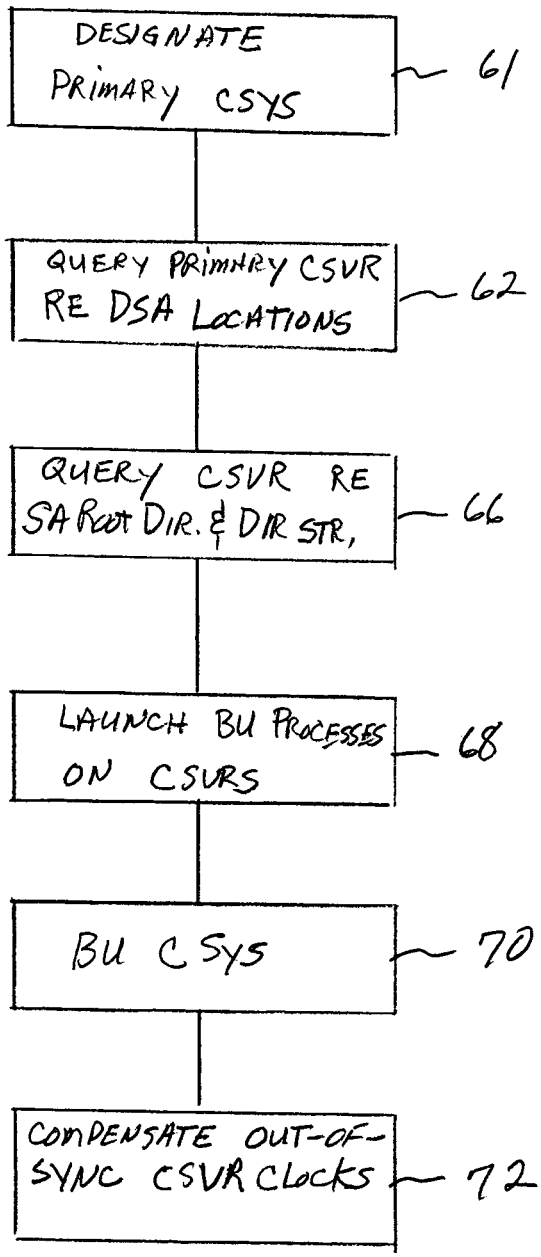
FIG. 4 is a flowchart illustrating in more detail certain aspects of the backup process of FIG. 3.

As shown in more detail in FIG. 4, the process of discovering the distributed content systems and storage areas begins with designating one content system as a primary content system at 61. This is the content system on which the backup process is started. The primary content system stores a centralized database and full text index for the enterprise content systems, as well as centralized configuration information for the remote hosts. Since the remote host may employ different file systems from the primary content server, the centralized configuration file information stores parameters needed by the remote hosts to start processes.

As indicated at 62 in FIG. 4, the backup process may query the primary content server (PCS) as to the locations of the distributed storage areas. For each content system on which there is a storage area, the content server of the content system is queried at 66 to determine the root directory and the directory structure of the storage area on that server. At 68, backup client modules are launched on the remote servers by the backup process. Next, at 70, backup of the content systems is performed. At 72 the process compensates for out-of-sync clocks. Although all servers in a system have their clocks set to the same UTC time, it is possible for the clocks to get out of synchronization.

Figure 5:
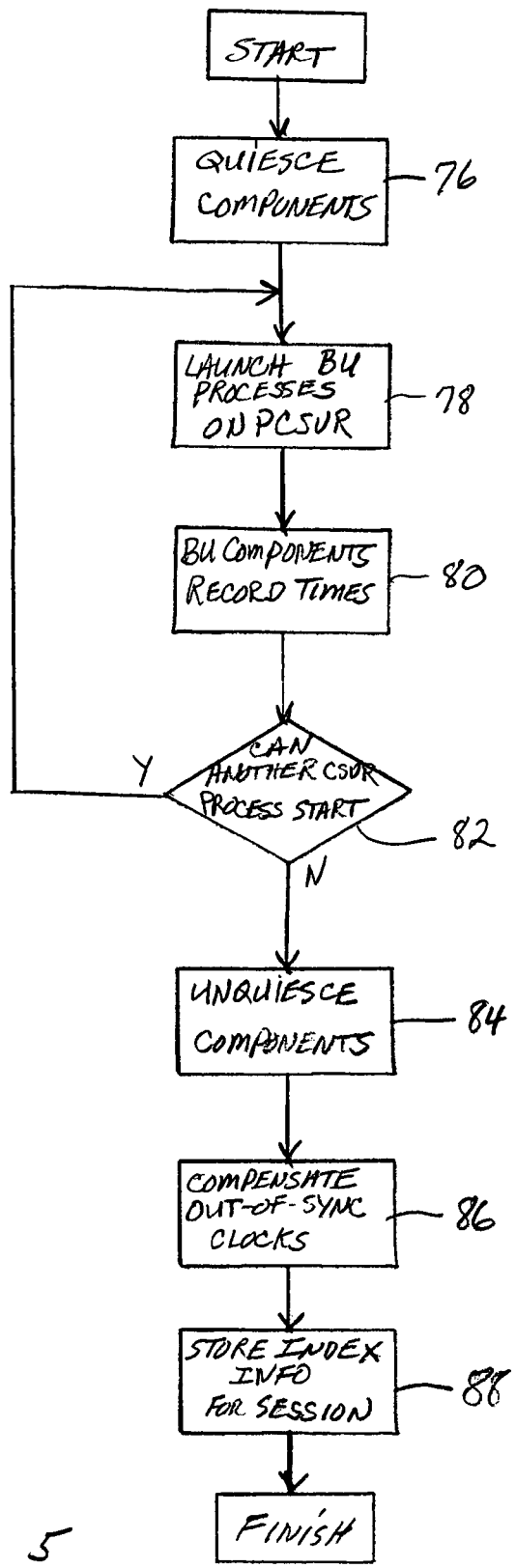
FIG. 5 is a flowchart illustrating in more detail an embodiment of a backup process for distributed content systems.

Referring to FIG. 5, an embodiment of the backup process is illustrated in more detail. At 76, the backup components are quiesced. As previously described, quiescing involves shutting down certain processes that may access and change backup components on a server (host), which could cause conflicts and inconsistencies. Additionally, quiescing may also include completing ongoing updating operations on a storage area. Next, at 78 the backup server 24 launches a backup client process on the primary content server (PCS), and at 80 the components are backed up. The backup process reads and records the clock information at 80 to synchronize the backup to the local content server clock. Clock synchronization comprises a process in which, for each content system being backed up, the clock of the local content system server is read at the time of backup and recorded into a backup file that is correlated with the particular logical backup session. It is important to be able to associate each backup component with the logical backup session to which the backup component pertains to facilitate recovery or restoration of files. The clock information recorded for the server comprises the local times at which each of the components of that remote content server are backed up, and the times are identified with the logical backup session to facilitate subsequent recovery or restoration.

At 82, if another content server (CSVR) process can be started, as, for example, if the number of already started and unfinished processes is less than the parallelism limit parameter for the system, the process returns to step 78 and launches another backup process Otherwise, the process continues at 84 where the components are unquiesced. At 86, the process may compensate for out-of-sync clocks, as previously indicated, and at 88 indexing information for the logical backup session is stored in order to permit recovery.

When backing up content systems, it is necessary to record and store indexing information with the backup identifying the times at which the backup occurs. Since different content systems may have different clock times, as previously described, it is important that compensation be made for out-of-sync clocks during backup in order to permit recovery.

Figure 6:
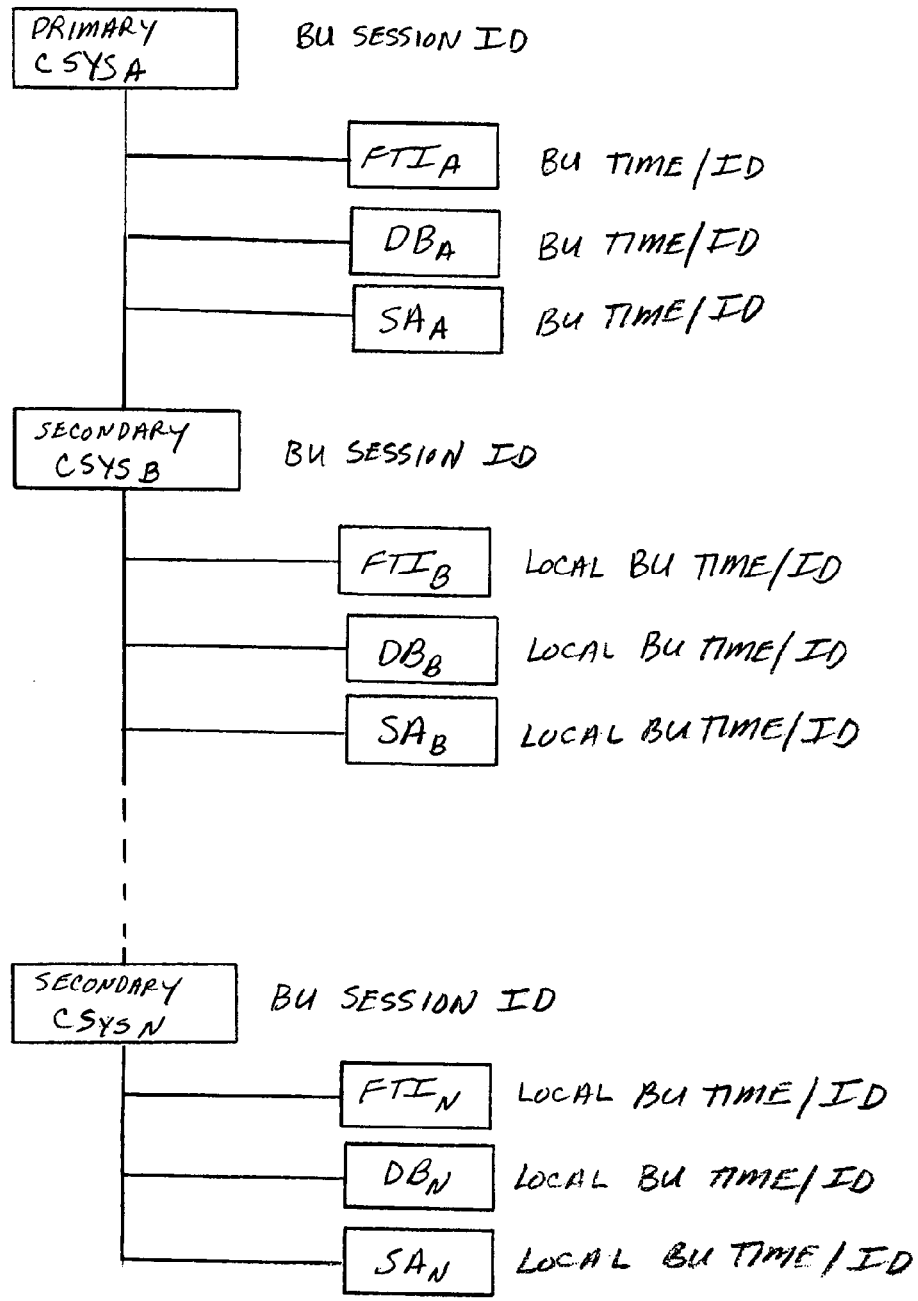
FIG. 6 is a diagrammatic view illustrating the organization and structure of a backup log which may be employed in the invention.

FIG. 6 illustrates diagrammatically an embodiment of an organization of a backup index or log which includes identification information for a backup session and for the backup times for each of the components of the various content systems of the enterprise. As shown, for each content system, beginning with the primary content system, a backup session identification is recorded along with the local times at which a backup occurs for the full text index, the database, and the storage areas associated with that content system. The recorded information may also include identifiers to locate the particular backup files. Similar information is recorded for each of the other content servers of the enterprise system. Thereafter, to restore particular files from a backup media, for a given backup session, the backup logs identify the corresponding backup components for that backup session. These identifications and times may be used to restore individual backup components.

Figure 7:
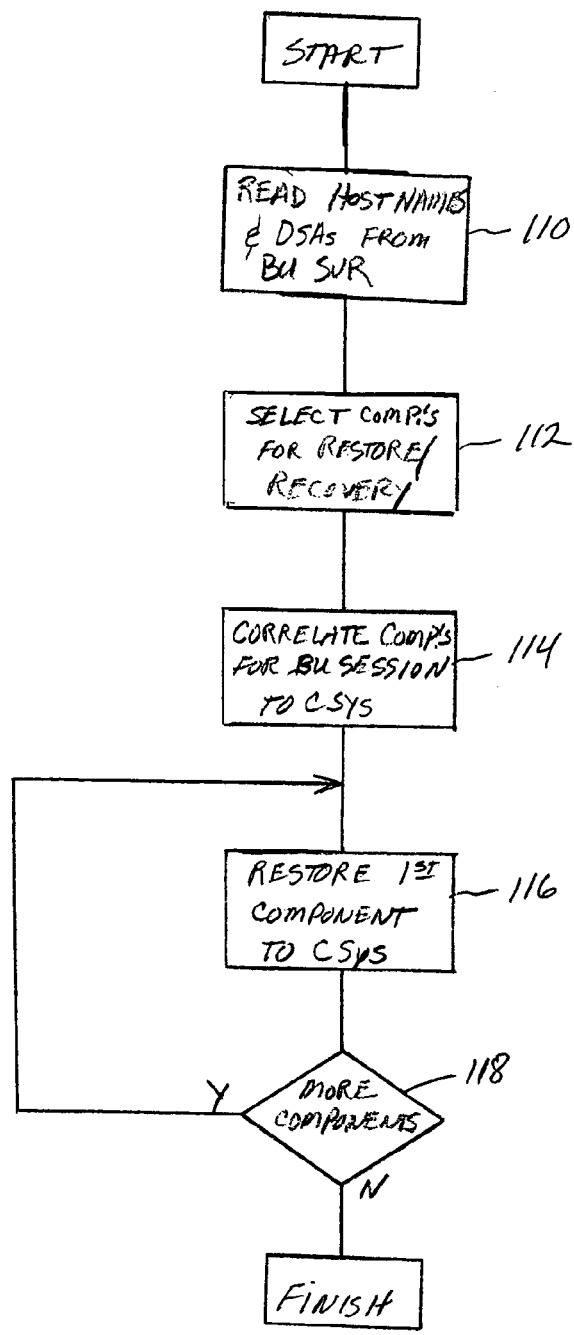
FIG. 7 is a flowchart of a restore/recovery process which may be employed in the invention.

FIG. 7 gives an overview of an embodiment of a restore/recovery process. The restore/recovery process begins at 110 by reading a list of host names of the distributed storage areas from the backup server backup indexes. At 112, content system components that are to be restored or recovered are selected based upon the backup indexes, and the components for a particular backup session are correlated to a content server at 114. At 116, a first component is restored from the backup media to a content system by executing a recover command on the primary or a secondary content system server. At 118, if there are additional components to be recovered, the restoration process of 116 is repeated until all components have been recovered.

As will be appreciated, the backup server 24 and backup module 32 control the backup and the restore/restoration processes. Backup may be performed on a scheduled basis or an ad hoc basis, and backup may comprise a full system backup or a snapshot of only a portion of the system. In a preferred embodiment, manual editing of the configuration files is performed. In another embodiment, the backup administrator console 28 may allows the backup administrator to determine the parameters for backup, as well as for recovery and restoration processes.

As will also be appreciated from the foregoing, the invention enables distributed content systems in an enterprise to be backed up in a pre-selected order, and also enables the components within each content system to be backed up in a predetermined order. During the backup, all content systems remain accessible. Overall disruption of normal content management processes is thus minimized and greater efficiency is afforded.

While the foregoing description has been with reference to particular preferred embodiments of the invention, it will be appreciated by those skilled in the art that variations in these embodiments may be made without departing from the principals of the invention, the scope of which is defined by the appended claims. In particular, it will be appreciated that the various process steps described in the foregoing embodiments do not always necessarily have to occur, nor do the process steps necessarily have to occur in the particular order in which they are described. Rather, depending upon the particular content system being backed up, some process steps may be unnecessary and others may be performed in different orders or sequences.

The invention claimed is:

1. A method for backing up distributed storage areas associated with a plurality of distributed content systems in an enterprise by a central backup server running a centralized backup application, the plurality of content systems of the enterprise being connected to the central backup server, the central backup server providing centralized backup management of the plurality of content systems, each content system having a content server running a backup client process of the centralized backup application on the central backup server, comprising:

causing a primary content server of said plurality of content systems to identify the locations of said distributed storage areas associated with said plurality of content systems;

launching by said centralized backup application the backup client process on each of the content servers of said content systems associated with one or more of said identified distributed storage areas; and controlling said backup client processes on said content servers by said centralized backup application to back up selected ones of said distributed storage areas to backup media;

wherein said distributed storage areas store managed content, and said method further comprises backing up metadata associated with said managed content in a database, and updating an index file of content backed up in said distributed storage areas;

wherein said content systems each have a local clock, and said method comprises compensating for out-of-sync clocks of said content systems for a logical backup session.

2. The method of claim 1 further comprising creating a backup log for said logical backup session, the backup log comprising, for each distributed storage area, records identifying the local backup times of said distributed storage area, said database and said index file.

3. A method for backing up distributed storage areas associated with a plurality of distributed content systems in an enterprise by a central backup server running a centralized backup application, the plurality of content systems of the enterprise being connected to the central backup server, the central backup server providing centralized backup management of the plurality of content systems, each content system having a content server running a backup client process of the centralized backup application on the central backup server, comprising:

causing a primary content server of said plurality of content systems to identify the locations of said distributed storage areas associated with said plurality of content systems;

launching by said centralized backup application the backup client process on each of the content servers of said content systems associated with one or more of said identified distributed storage areas; and controlling said backup client processes on said content servers by said centralized backup application to back up selected ones of said distributed storage areas to backup media;

wherein said identifying said locations comprises identifying by said primary content server the host names of the content servers of said content systems having associated distributed storage areas.

4. The method of claim 3, wherein said causing the primary content server to identify the locations of distributed storage areas further comprises querying each content system identified by the primary content server as to a root directory and directory file structure of an associated distributed storage area.

5. The method of claim 4, wherein said launching of said backup process comprises launching backup client processes on said content servers by the centralized backup application running on the central backup server, and wherein said backing up comprises communicating between said backup client processes and said centralized backup application to manage the backup process.

6. The method of claim 5, wherein said central backup server controls said backup media and manages said backup process.

\* \* \* \* \*